United States Patent [19]
Wrathall

[11] Patent Number: 6,002,244
[45] Date of Patent: Dec. 14, 1999

[54] TEMPERATURE MONITORING CIRCUIT WITH THERMAL HYSTERESIS

[75] Inventor: Robert S. Wrathall, Scotts Valley, Calif.

[73] Assignee: Impala Linear Corporation, Sunnyvale, Calif.

[21] Appl. No.: 09/193,659

[22] Filed: Nov. 17, 1998

[51] Int. Cl.$^6$ ........................................ G05F 3/20
[52] U.S. Cl. ............................. 323/315; 323/907
[58] Field of Search .................... 323/313, 315, 323/317, 901, 907

[56] References Cited

U.S. PATENT DOCUMENTS

| | | | |
|---|---|---|---|
| 4,450,367 | 5/1984 | Whatley | 323/315 X |
| 4,789,819 | 12/1988 | Nelson | 323/314 |
| 4,887,181 | 12/1989 | Lenz | 361/103 |
| 4,954,769 | 9/1990 | Kalthoff | 323/313 |
| 5,132,556 | 7/1992 | Cheng | 323/315 X |
| 5,543,632 | 8/1996 | Ashley | 257/48 |

Primary Examiner—Y. J. Han
Attorney, Agent, or Firm—Law Offices of Terry McHugh; Thomas H. Ham; Terry McHugh

[57] ABSTRACT

A temperature monitoring circuit with thermal hysteresis in CMOS circuitry utilizes bipolar transistors which are parasitic to standard CMOS circuitry. A concept of band-gap circuitry is used to provide a proportional to absolute temperature (PTAT) current, which is used as a reference. An output signal is produced above a predetermined temperature by comparing current changes between the PTAT current and a PTAT controlled current in a single current path. The PTAT controlled current decreases faster with temperature increase than the change in the PTAT current. The thermal hysteresis is accomplished by inverting the output signal to control a hysteresis transistor for selectively shorting out a hysteresis resistor. In the preferred embodiment, a start circuit is attached to the temperature monitoring circuit with thermal hysteresis to provide an initial current to activate the present invention. The start circuit is quickly shorted out once the devices of the present invention are turned on.

19 Claims, 2 Drawing Sheets

TEMPERATURE MONITORING CIRCUIT WITH THERMAL HYSTERESIS

TECHNICAL FIELD

The invention relates generally to temperature monitoring circuits and more particularly to temperature monitoring circuits with thermal hysteresis in CMOS circuitry.

BACKGROUND ART

A temperature monitoring circuit has many applications. One crucial application for temperature monitoring circuitry is to protect electronic components from being subjected to high temperatures. Cellular phones, laptop computers, and other battery-operated powered electronic devices have numerous electronic components which can be easily damaged by high temperatures. For example, transistors in integrated circuits in battery-operated powered electronic devices are known to breakdown at high temperatures.

Typically, a temperature monitoring circuit utilizes the properties of a bipolar transistor. In operation, a temperature independent reference voltage is generated by use of a band-gap circuit, a known technology in the field. The reference voltage is compared with a temperature-dependent voltage. When a certain criterion is met, a voltage signal is produced to indicate excessive temperature.

U.S. Pat. No. 4,887,181 to Lenz describes a temperature protection circuit that applies the fundamental concepts of a band-gap circuit and a bipolar transistor. The temperature protection circuit amplifies the reference voltage from the band-gap circuit by an amplifier circuit and delivers the amplified voltage to a sensor circuit which compares the amplified voltage with a temperature-dependent voltage generated by the sensor circuit. The temperature protection circuit also includes a positive feedback loop from an output of the amplifier circuit back to an input of the amplifier circuit. The sensor circuit is connected to a bipolar transistor which is turned on when the comparison of the amplified voltage with the temperature-dependent voltage indicates that a set temperature has been reached. A current flow caused by the activation of the bipolar transistor causes a power amplifier, the electronic component that is being protected, to shut off. The temperature protection circuit also exhibits a hysteresis characteristic due to the sensor circuit being thermally coupled to the power amplifier.

U.S. Pat. No. 4,789,819 to Nelson utilizes a specific band-gap circuit, i.e. a Brokaw Cell band-gap circuit, to provide biasing for a thermal shutdown circuit. The Nelson circuit modified the basic Brokaw Cell band-gap circuit by including a breakpoint compensation. The basic Brokaw Cell band-gap circuit generates an output voltage that is nearly constant with temperature variations. However, the fluctuation of the output voltage increases with greater temperature variations. The breakpoint compensation of Nelson shifts a temperature coefficient of the circuit to decrease the voltage fluctuation over a certain temperature range. The circuit, similar to the circuitry described in the Lenz patent, includes a bipolar transistor that turns on when a predetermined temperature is reached and the base of the bipolar transistor is thereby properly biased.

While the two disclosed circuits operate well for their intended purposes, there are concerns regarding their limitations. For circuitry that includes complementary metal-oxide semiconductor (CMOS) transistors, a temperature protection circuit utilizing bipolar transistors is very difficult to manufacture due to the lack of general purpose bipolar transistors.

What is needed is a temperature protection circuit that utilizes standard CMOS integrated circuit technology processing without the need to fabricate special bipolar transistors.

SUMMARY OF THE INVENTION

A circuit for generating a signal that is responsive to variations in temperature includes using at least two and as many as four current paths to provide a thermal limit. The first and second current paths combine to form a band gap like circuit that is temperature sensitive. In the preferred embodiment, the band gap like circuit generates a proportional to absolute temperature (PTAT) current. The preferred embodiment also utilizes parasitic bipolar transistors from the CMOS technology as a high current density bipolar transistor of the first current path and a low current bipolar transistor of the second path. A first resistor is connected within the second current path such that the voltage across the first resistor is a PTAT voltage. The current through the first resistor has a general PTAT character.

In one embodiment, the components of the first and second current paths combine to form three transistor pairs. In both the first and second transistor pairs, a MOS transistor of the first current path has a geometry greater than that of the comparable MOS transistor of the second current path, so that current through the first current path is a multiple of that through the second current path. On the other hand, in the third transistor pair, i.e., the parasitic bipolar transistors, the transistor of the first current path is smaller than the transistor of the second current path.

In the preferred embodiment, a third current path utilizes electronic components that are the equivalent types and sizes of the first current path. A gate of a MOS transistor is controlled by connection to the second current path, while the drain of the same transistor is connected to the gates of the second transistor pair of the first and second current paths. As a result, a feedback loop is formed to maintain a voltage of approximately one PMOS threshold below a high voltage rail at the connection of the second current path with the gate of the MOS transistor of the third current path.

The PTAT current is also mirrored through a MOS transistor of a fourth current path. This current through the fourth current path may be conducted to ground through a series connection of a thermal set transistor and a thermal set resistor. However, the thermal set transistor is an NMOS transistor having a gate connected to the third current path. When the PTAT current exceeds the current carrying capability of the NMOS transistor of the fourth current path, an output current is generated from the fourth current path. Thus, the output voltage is caused by the differential of two temperature-dependent currents within the fourth path, which generates the over temperature signal, depending on whether the differential is positive or negative.

The preferred embodiment also includes a hysteresis circuit. A hysteresis resistor is connected in series with the thermal set resistor, but is selectively shorted out by a hysteresis transistor. The hysteresis transistor is turned off by the initiation of output current from the fourth current path, thereby introducing the hysteresis resistor into the fourth path. This increases the differential output current. The temperature that must be reached in order to turn the hysteresis transistor back on is less than the temperature that was required to turn the hysteresis transistor off.

The circuit preferably includes a start circuit that consists of a resistor and a number of MOS transistors. The start circuit activates current flow through the four current paths and then quickly shuts itself off.

The invention provides a circuit that can be produced by standard CMOS processing to provide a robust thermal limit. The use of the parasitic bipolar transistors alleviates fabrication processing concerns and decreases the cost of manufacture.

DETAILED DESCRIPTION

Figure 1:
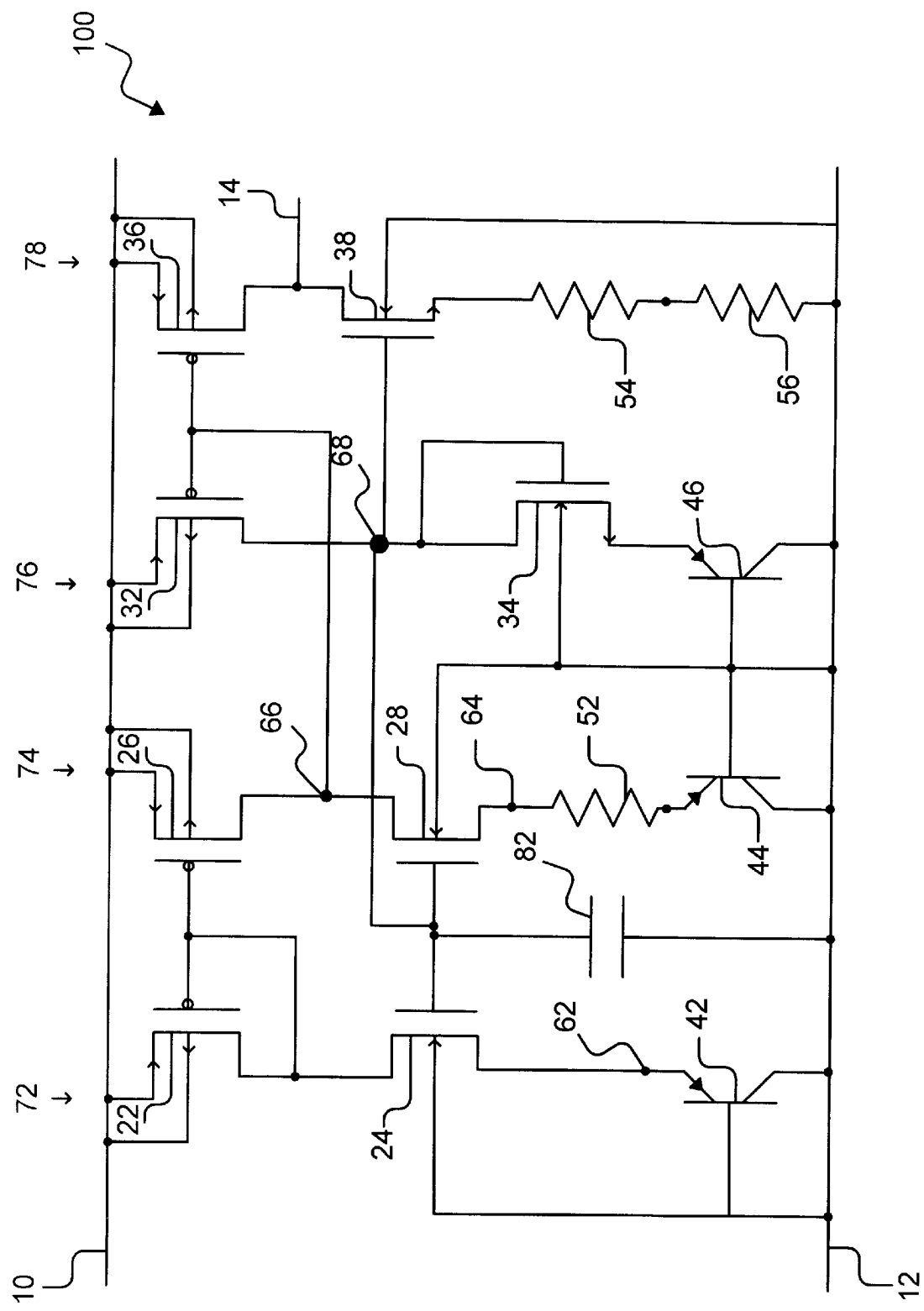
FIG. 1 is a schematic view of an embodiment of a temperature monitoring circuit in accordance with the invention.

With reference to FIG. 1, a temperature monitoring circuit 100 is shown as being connected to a high voltage rail (Vin) 10 and a low voltage rail (Gnd) 12. The voltage on Vin may be either positive or negative. As an example, Vin may be a supply rail for 3.5 volts and Gnd may be electrical ground. Four current paths are connect from Vin 10 to Gnd 12. A first current path 72 consists of two metal-oxide semiconductor (MOS) transistors 22 and 24, and a bipolar transistor 42. Similar to the first current path 72, a second current path 74 consist of two MOS transistors 26 and 28 and a bipolar transistor 44 with an additional component, a resistor 52. The MOS transistors 24 and 28 shown are n-channel MOS transistors and define a first transistor pair, while the MOS transistors 22 and 26 shown are p-channel MOS transistors and define a third transistor pair. The second transistor pair is formed by the bipolar transistors 42 and 44, which are shown as pnp parasitic bipolar transistors. Standard CMOS processing creates such pnp parasitic bipolar transistors.

The two MOS transistors 22 and 24 and the bipolar transistor 42 are connected in series from Vin 10 to Gnd 12 to form the first current path. The bipolar transistor 42 is connected to Gnd 12 and the MOS transistor 24 such that a base and a collector of bipolar transistor 42 are coupled to Gnd 12 and an emitter of bipolar transistor 42 is connected to a source of MOS transistor 24. The MOS transistor 24 is connected to MOS transistor 22 by drains of the MOS transistors 22 and 24. A source of the MOS transistor 22 is connected to the Vin 10, which completes the first current path 72. The base of bipolar transistor 42 is connected to Gnd 12.

The second current path 74 contains all the electronic components of the first current path 72 with the addition of the resistor 52. In the second current path 74, a base and a collector of bipolar transistor 44 are also connected to Gnd 12. However, an emitter of bipolar transistor 44 is connected to the resistor 52 which is connected to a source of MOS transistor 28. The MOS transistors 26 and 28 are connected to each other and the Vin 10 in the same manner as in the first current path 72. Drains of both MOS transistors 26 and 28 are coupled together. At the connection of the drains of MOS transistors 26 and 28 is a node identified as a gain node 66. The gain node 66 is important to the operation of the circuit which will be addressed below. A source of MOS transistor 26 makes the final connection to Vin 10.

The first current path 72 and the second current path 74 are connected by the coupling of gates of the third transistor pair formed by the MOS transistors 22 and 26, as well as the coupling of gates of the first transistor pair formed by MOS transistors 24 and 28. The gates of MOS transistors 22 and 26 are connected to the drain of MOS transistor 22. However, the gates of MOS transistors 24 and 28 are not connected to either the first current path 72 or the second current path 74. Instead, the gates of MOS transistors 24 and 28 are connected to a third current path 76 at a control node 68.

The first current path 72 and the second current path 74 utilize the concept of band-gap technology, a known technique in the field, to generate a proportional to absolute temperature (PTAT) current through the MOS transistor 22. This is accomplished by generating a PTAT voltage across the resistor 52. To generate the PTAT voltage, the voltage at a node 62 located between the emitter of bipolar transistor 42 and the source of MOS transistor 24 must be made to equal the voltage at a node 64 located between the resistor 52 and the source of MOS transistor 28. If the current density of bipolar transistor 42 is greater than the current density of bipolar transistor 44, the voltage drop across the bipolar transistor 42 will be greater than the voltage drop across the bipolar transistor 44. Utilizing the band-gap technology, a circuit can be designed in which conditions will yield a result such that the voltage at node 62 will equal the voltage at node 64. Since the voltage at node 62 equals the voltage at node 64 and the voltage drop across bipolar transistor 44 is less than the voltage drop across the bipolar transistor 42, the voltage difference between the voltage at node 62 and the voltage drop across bipolar transistor 44 will appear across the resistor 52.

The voltage across the resistor 52 is proportional to $(kT/q)* \log(n)$ where k is the Boltzmann's constant, T is the absolute temperature, q is the electronic charge, and n is the ratio of the current densities of the bipolar transistors 42 and 44. As an example, the current density of bipolar transistor 42 is four times greater than the current density of bipolar transistor 44. One way to accomplish such a ratio is to fabricate the first transistor pair such that MOS transistor 24 passes twice the current through the MOS transistor 28. This may be accomplished by fabricating MOS transistor 24 to have a gate width or other impedance-affecting dimension that is twice as large as that of MOS transistor 28. In addition, the bipolar transistor 44 is parasitically fabricated to be twice as large as the parasitic bipolar transistor 42. The result will be that the current density of bipolar transistor 42 is four times greater than the current density of bipolar transistor 44. Then, n in the formula $(kT/q)*\log(n)$ will equal four.

Not critical to the present invention is the presence of a capacitor 82, which is connected to the gates of MOS transistors 24 and 28 and Gnd 12. However, the capacitor 82 functions to provide alternating current stability of the present invention.

The third current path 76 is created by two MOS transistors 32 and 34 and a parasitic bipolar transistor 46 that are connected in series from Vin 10 to Gnd 12. Except for the two gates and the base of the three transistors 32, 34, and 46, these transistors 32, 34, and 46 are connected in the same manner as the transistors 22, 24, and 42 in the first current path 72. The two major differences between the third current path 76 and the first current path 72 are that a gate of MOS transistor 32 is connected to the gain node 66 on the second current path 74 and the gate and drain of MOS transistor 34 are connected to each other and to the gates of MOS transistors 24 and 28 at the control node 68.

One function of the third current path 76 is to force the current through the MOS transistor 32 to be equal to the PTAT current through the MOS transistor 22. This is accomplished by the selection of the geometries of the components that make up the third current path 76. The dimensions of the bipolar transistor 46 equal the dimensions of the bipolar transistor 42. Similarly, the dimensions of the MOS transistor 34 equal the dimensions of the MOS transistor 24, and the dimensions of the MOS transistor 32 equal the dimensions of the MOS transistor 22. Therefore, the current through the MOS transistor 32 equals the PTAT current through the MOS transistor 22.

Another function of the third current path 76 is to ensure that the current supplied to the MOS transistor 24 is twice the current supplied to the MOS transistor 28. When the two-to-one ratio of the currents through the MOS transistors 24 and 28 is maintained, the voltage at node 62 is equal to the voltage at node 64. If the two-to-one ratio of currents through the MOS transistors 24 and 28 is disturbed, the third current path 76 cooperates to adjust the current flow through the MOS transistors 24 and 28. The voltage at the gain node 66 is maintained at approximately one PMOS threshold below the supply voltage at Vin 10 by operation of a feedback loop via PMOS transistor 32. For example, if the voltage at node 64 falls below the voltage at node 62, the voltage on the gain node 66 will also fall. The voltage drop on the gain node 66 will be reflected at the gate of MOS transistor 32. The drop in voltage at the gate of MOS transistor 32 will increase the current through the MOS transistor 32. The increase in current through the MOS transistor 32 will cause the voltage at the gates of MOS transistors 24 and 28 to rise. The voltage rise at the gates of MOS transistors 24 and 28 will induce more current to flow through the MOS transistors 24 and 28 to increase the voltage at node 64 by re-establishing the two-to-one ratio of the currents through MOS transistors 24 and 28. As a result, the current flowing in the respective transistors 22, 26 and 32 will be proportional to each other and generally PTAT.

In an alternative configuration, the MOS transistor 34 and the parasitic bipolar transistor 46 may be replaced by a resistor. In this configuration, the gate of transistor 32 is connected to the gates of transistors 22 and 26, instead of being connected to the gain node 66. The alternative configuration does not affect the overall operation of the circuit 100. The currents in critical legs are identical for both configurations.

The fourth current path 78 is formed by two MOS transistors 36 and 38 and two resistors 54 and 56 which are connected in series. A source of MOS transistor 36 is connected to Vin 10. A gate of MOS transistor 36 is coupled to the gate of MOS transistor 32, forming a current mirror. Thus, the current through the MOS transistor 32 is mirrored by the MOS transistor 36. Since the current through the MOS transistor 32 is generally PTAT, the current through the MOS transistor 36 is also generally PTAT. A drain of MOS transistor 36 is connected to an initial output terminal 14, which is also connected to a drain of MOS transistor 38. A gate of MOS transistor 38 is connected to the control node 68. A source of MOS transistor 38 is connected to the resistor 54, which is connected to the resistor 56. The resistor 56 is connected to Gnd 12, completing the fourth current path 78.

In operation, the degree of change in the PTAT current through the MOS transistor 36 as compared to the degree of change in the current through the MOS transistor 38 caused by temperature changes produces a signal at thermal limit to the initial output terminal 14. The thermal limit point can be set at a predetermined temperature by the electrical resistances in resistors 54 and 56. At temperatures below the thermal limit, the MOS transistor 38 is able to dispose of all the current through the MOS transistor 36. However, the current through the MOS transistor 38 is decreasing much faster with temperature increase than the current change through the MOS transistor 36 as a function in temperature change. With the increase in temperature, the thermal limit will be reached where the MOS transistor 38 cannot sink all the current that the MOS transistor 36 has generated. At such condition, the voltage on the terminal 14 will rise steeply with increased temperature. The voltage increase in the initial output terminal 14 is indicative of the thermal limit.

Figure 2:
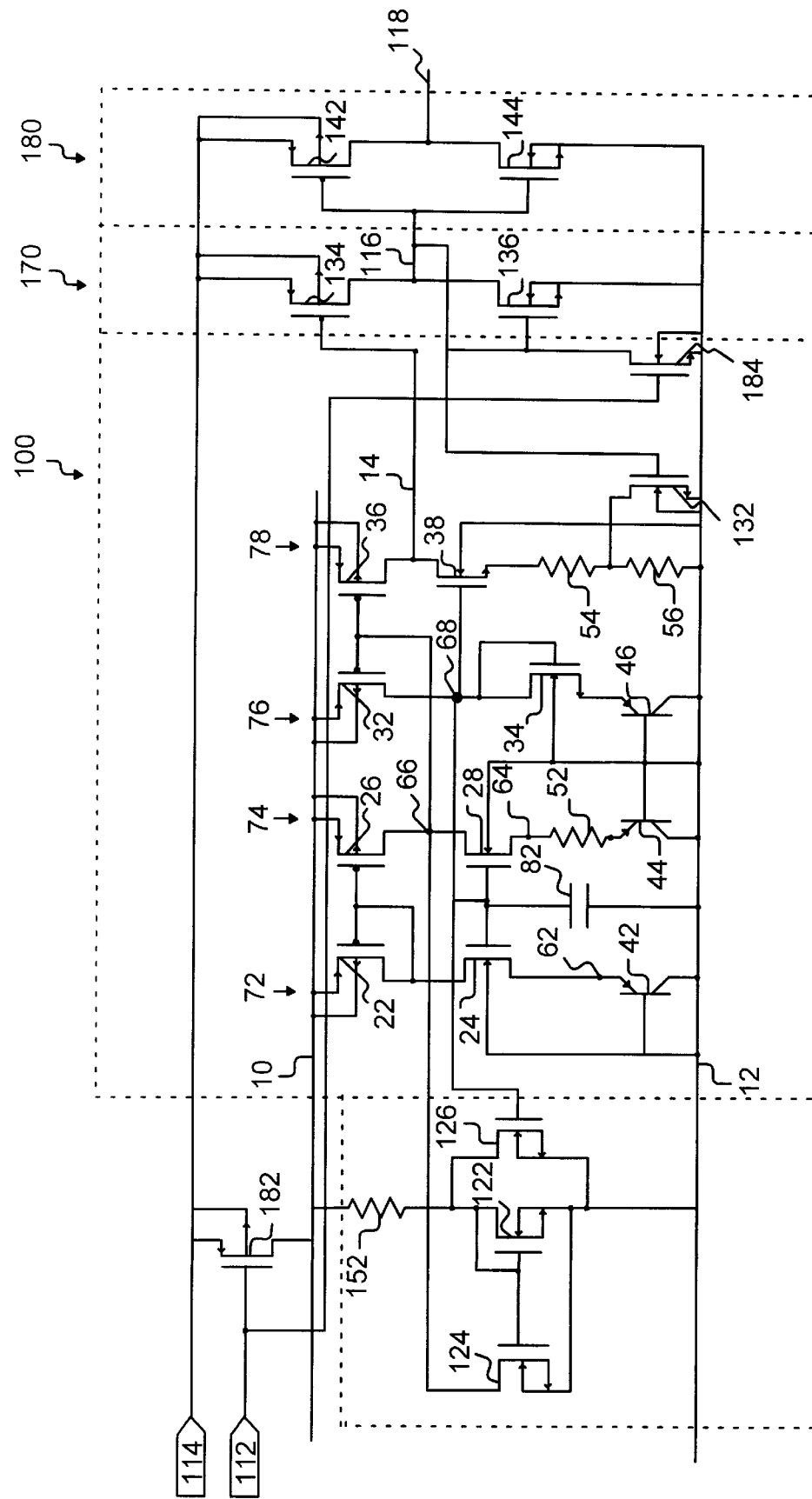
FIG. 2 is a schematic view of an embodiment of FIG. 1 with additional features which include a start circuit, a thermal hysteresis circuit, and inverters.

FIG. 2 shows the circuit shown in FIG. 1 with the addition of a start circuit 160, a thermal hysteresis loop formed by a first stage inverter 170 and a MOS transistor 132, two on/off MOS transistors 182 and 184, and a second stage inverter 180. The MOS transistor 182 is shown to operate as an on-and-off switch for the present invention. A gate of MOS transistor 182 is connected to a control voltage source 112. A source of MOS transistor 182 is connected to an input voltage source 114 to provide the voltage to Vin 10, which is connected to a drain of MOS transistor 182. Although the MOS transistor 182 is shown as the switch, the MOS transistor 182 may be replaced by other electronic devices to accomplish the switching function of the MOS transistor 182.

The start circuit 160 consists of a resistor 152, and three MOS transistors 122, 124, and 126. The resistor 152 is connected between Vin 10 and the MOS transistors 122 and 126. A drain and a gate of MOS transistor 122 are connected to the resistor 152. The gate of MOS transistor 122 is coupled with a gate of MOS transistor 124. Sources of MOS transistors 122 and 124 are connected to Gnd 12. Finally, a drain of MOS transistor 124 is connected to the gain node 66. When the MOS transistor 182 is initially activated, current travels through the resistor 152 and the two MOS transistors 122 and 124 are turned on, completing a temporary path for providing current to the gain node 66. Completion of the temporary path initiates current flow through the current paths 72, 74, 76, and 78. The MOS transistor 126 is connected to the source and drain of MOS transistor 122 to act as a short circuit when activated. A drain of MOS transistor 126 is connected to the drain of MOS transistor 122. Similarly, a source of MOS transistor 126 is connected to the source of MOS transistor 122. A gate of MOS transistor 126 is connected to the control node 68. Once the start circuit 160 provides current to the gain node 66, the voltage on the control node 68 quickly shorts out the start circuit 160 by turning on the MOS transistor 126, thereby causing the temporary path through the MOS transistor 124 to be turned off.

The thermal hysteresis loop is made up of the first stage inverter 170 and the MOS transistor 132. The inverter 170 is made up of two MOS transistors 134 and 136. Gates of MOS transistors 134 and 136 are coupled and connected to the initial output terminal 14 to receive the high voltage signal. A source of MOS transistor 134 is connected to the Vin 10, while a source of MOS transistor 136 is connected to Gnd 12. Drains of MOS transistors 134 and 136 are coupled and connected to an inverted output node 116. The inverted output node 116 is connected to a gate of MOS transistor 132. A source of MOS transistor 132 is connected to Gnd 12. A drain of MOS transistor 132 is connected to the fourth current path 78 between the resistors 54 and 56.

When the current at the initial output terminal 14 rises, the current at the inverted output node 116 drops, turning off the MOS transistor 132. Switching the hysteresis transistor 132 from the "on" state to the "off" state introduces the resistor 56 into the path through MOS transistor 38 to Gnd. Consequently, the current differential between current through MOS transistor 36 and current through MOS transistor 38 is abruptly increased. This has two effects. Firstly, the corresponding abrupt increase at the initial output terminal 14 translates into a sharp and distinctive rise at a final output terminal 118. Secondly, the voltage at the inverted output node 116 is driven downwardly, turning the hysteresis transistor 132 off more strongly. The temperature that must be obtained to switch the hysteresis transistor from off to on, shorting the hysteresis resistor 56 out of the fourth current path 78, is therefore different than the temperature that caused the hysteresis transistor to switch from on to off. The difference between these two switching temperatures is determined by the resistance of the hysteresis resistor 56. In one embodiment, the temperature difference is 10° Celsius.

As can be seen in FIG. 2, the first stage inverter 170 is connected to the MOS transistor 184 such that a drain of MOS transistor 184 is connected to the gate of MOS transistor 136. A source of MOS transistor 184 is connected to Gnd 12. The MOS transistor 184 is a switch that operates in unison with the MOS transistor 182. As with the MOS transistor 182, a gate of MOS transistor 184 is also connected to the control voltage source 112.

The second stage inverter 180 is formed by MOS transistors 142 and 144, which are connected in the same manner as the MOS transistors 134 and 136 of the first stage inverter. Gates of MOS transistors 142 and 144 are coupled and connected to the inverted output node 116. The second stage inverter 180 allows the final output signal to be positive when the thermal limit point has been reached.

The operation of the present invention will be described with reference to FIG. 2. Initially, a low voltage is supplied by the control voltage source 112 which turns on the MOS transistors 182 and 184. The activation of the MOS transistor 182 allows the current to travel through the MOS transistor 182, connecting the input voltage source 114 with Vin 10. Current flows through the resistor 152, the MOS transistor 122, and the MOS transistor 124 to complete a flow path for current flow to the gain node 66. The presence of voltage at the gain node 66 initiates the operations of the current paths 72, 74, 76, and 78. The current through the third current path 76 activates the MOS transistor 126, since control node 68 is connected to the gate of MOS transistor 126. The activation of the MOS transistor 126 shorts out the path for maintaining transistors 122 and 124 in an on state by providing an alternate route for the current from the resistor 152 to Gnd 12. Thus, shorting after the start circuit 160 is turned on, it is turned off by the short circuit which is formed by the activation of the MOS transistor 126.

The temperature monitoring circuit produces a PTAT current through MOS transistor 22 as a result of a PTAT voltage across the resistor 52. To produce the PTAT voltage, a band-gap circuit is utilized. The bipolar transistor 42 is half as large as the bipolar transistor 44. If the current through MOS transistor 24 is twice the current through MOS transistor 28, the current density of bipolar transistor 42 will be four times the current density of bipolar transistor 44. Utilizing the concept of band-gap technology, it can be determined that the voltage at node 62 equals the voltage at node 64 when all the above requirements are satisfied. The voltage across the resistor 52 is proportional to absolute temperature or PTAT. Since the voltage at node 62 equals the voltage at node 64, the current through the first current path 72 is PTAT. Therefore, the current through the MOS transistor 22 is PTAT.

To ensure that the two-to-one ratio of currents through the MOS transistors 24 and 28 is maintained, the gain node 66 monitors voltage variations and controls the current through the MOS transistor 32, which controls the currents through the MOS transistors 24 and 28. For example, if the voltage at node 64 falls below the voltage at node 62, this indicates that the current flow ratio for the MOS transistors 24 and 28 is not two-to-one. The voltage at the gain node 66 is very sensitive to such variation in the current flow ratio. In the example, the voltage at the gain node 66 will drop, causing the voltage at the gate of MOS transistor 32 to drop as well. The low voltage at the gate of MOS transistor 32 causes more current through the MOS transistor 32. The increase in current through the MOS transistor 32 will increase the voltage at the gates of MOS transistors 24 and 28 through the control node 68, causing more current through the MOS transistors 24 and 28. The increase in current through the MOS transistors 24 and 28 re-establishes the two-to-one ratio of currents through the MOS transistors 24 and 28. The re-establishment of the two-to-one ratio raises the voltage at node 64 until the voltage at node 64 equals the voltage at node 62.

As stated above, the electronic components of the third current path 76 are identical in sizes and types to the electrical components of the first current path 72. Thus, the current through the MOS transistor 32 is identical to the current through the MOS transistor 22. The current through the MOS transistor 32 is mirrored by the MOS transistor 36. The current through the MOS transistor 36 is PTAT since the current through the MOS transistor 22 is PTAT. However, the current through the MOS transistor 38 is not PTAT. The current changes in MOS transistors 36 and 38 as a function of temperature increases will be used to signal when the temperature monitoring circuit 100 has reached the thermal limit that is established by resistors 52 and 54 and the physics of the parasitic bipolar transistors.

At room temperature or below the thermal limit temperatures, the MOS transistor 38 is able to dispose of all the current through the MOS transistor 36. However, as temperature rises, the current through the MOS transistor 38 decreases, while the current through the MOS transistor 36 tends to increase (depending upon the temperature coefficient of the resistor 52). Above the thermal limit, the MOS transistor 38 is unable to sink all the current that the MOS transistor 36 has supplied. At this point, the voltage on the terminal 14 will increase rapidly with temperature.

This rise in voltage at the initial output terminal 14 activates the inverter 170. The inverter 170 causes the voltage at the inverted output node 116 to go low. This low voltage is used to provide a thermal hysteresis. The low voltage at the inverted output node 116 is conducted to the gate of MOS transistor 132, turning the MOS transistor 132 off. Prior to being turned off, the MOS transistor shorted out the hysteresis resistor 56. However, turning the MOS transistor off reintroduces resistor 56 into the fourth current path 78, further decreasing the current through the MOS transistor 38 and driving up the voltage at the initial output terminal 14. The positive feedback behavior of the thermal hysteresis ensures an abrupt voltage rise at the final output terminal 118 of the second stage inverter 180. This abrupt change is amplified by the gains in the two stages of inversion. Depending on the resistance of the hysteresis resistor 56, the temperature drop required to turn the transistor 132 back on after shutdown can be high as 10° Celsius below the thermal limit.

Not critical to the present invention is the presence of the capacitor 82 which is connected to the gates of MOS transistors 24 and 28 and the Gnd 12. The capacitor 82 provides alternating current stability of the present invention.

What is claimed is:

1. A circuit for generating a signal that is responsive to variations in temperature comprising:
   a power source that includes a high voltage rail and a low voltage rail;
   a first current path between said high voltage rail and low voltage rail, said first current path including a series connection of a first MOS transistor and a high current density bipolar transistor;
   a second current path between said high voltage rail and said low voltage rail, said second current path including a series connection of a second MOS transistor, a low current density bipolar transistor and a first electrical resistance therebetween; and
   output circuitry means connected with respect to said first and second current paths for forming an output signal that is an indication of current change as a function of temperature, said output circuitry means including an initial output terminal and a series connection of a third MOS transistor, a fourth MOS transistor and a second electrical resistance, said initial output terminal being located between said third and fourth MOS transistors, wherein said output circuitry provides a third current path between said high voltage rail to said low voltage rail, said third MOS transistor being connected to mirror current through said second current flow path, said fourth MOS transistor being connected to decrease in current in response to temperature increases.

2. The circuit of claim 1 wherein said first and second MOS transistors have different geometries such that a current through said first MOS transistor is a multiple of the current through said second MOS transistor, said high and low current density bipolar transistors are formed such that a current density of said high current density bipolar transistor is a multiple of the current density of said low current density bipolar transistor.

3. The circuit of claim 1 wherein said first and second electrical resistances are first and second resistors.

4. The circuit of claim 1 further comprising a thermal hysteresis circuit having a first stage inverter with an input from said initial output terminal and having an inverted output node, said thermal hysteresis circuit further having a hysteresis transistor that is responsive to said signal at said inverted output node to switch between on and off states, said hysteresis transistor being in parallel with a hysteresis resistor that is in series with said second resistance such that said hysteresis resistor is selectively shorted out by switching said hysteresis transistor.

5. The circuit of claim 4 further comprising a second stage inverter having an input connected to said inverted output node and having a final signal output terminal.

6. The circuit of claim 1 further comprising a start circuit means for providing an initial current flows through said first and second current paths.

7. The circuit of claim 6 wherein said start circuit means includes a third electrical resistance, a fifth MOS transistor, and a sixth MOS transistor connected between said high voltage rail and said low voltage rail, said third electrical resistance being connected to a drain and gate of said fifth MOS transistor and to a gate of said sixth MOS transistor, said sixth MOS transistor having a source/drain path from said second current path to said low voltage rail, said start circuit means further comprising an seventh MOS transistor connected across said fifth MOS transistor to selectively short out said fifth MOS transistor.

8. The circuit of claim 1 wherein said high voltage rail provides a negative voltage and wherein said low voltage rail is electrically grounded.

9. A circuit for generating a signal that is responsive to variations in temperature comprising:
   a band gap circuit that generates a proportional to absolute temperature (PTAT) voltage, said band gap circuit having first and second bipolar transistors with mismatched current densities;
   a first MOS transistor connected to said band gap circuit, said first MOS transistor having a source/drain conduction path that is in parallel with a conduction path through said first and second bipolar transistors and being dimensioned such that current through said source/drain conduction path is PTAT, said first MOS transistor being configured to generate a first current that is responsive to variations of said PTAT voltage;
   a current output path connected to said first MOS transistor to provide an output for conduction of said first current;
   thermal set means, connected to provide a primary path for conduction of said first current, for controlling said conduction of said first current via said current output path, said thermal set means being connected to said band gap circuit such that said thermal set means is responsive to said variations in said PTAT voltage, said thermal set means including a second MOS transistor and a resistance in a series connection with said first MOS transistor, said second MOS transistor having a gate that is connected to said band gap circuit; and
   hysteresis means for reducing said resistance of said thermal set means in response to current flow along said current output path.

10. The circuit of claim 9 wherein said hysteresis means includes a parallel connection of a hysteresis resistor and a hysteresis transistor, said hysteresis transistor being connected to short out said hysteresis resistor in response to said current flow along said current output path.

11. The circuit of claim 9 wherein said first and second bipolar transistors are parasitic transistors.

12. A circuit for generating a signal that is responsive to variations in temperature comprising:
    a band gap circuit having parallel first and second current paths, said first current path including a low current density bipolar transistor, said second current path including a high current density bipolar transistor;
    a third current path that is substantially equivalent to said first current path for matching current flow of said first current path, said current flow of said third current path being coupled to control current flow through said first and second current paths; and
    a fourth current path having output means for generating an output current in response to variations of $V_{be}$ for said low and high current density bipolar transistors.

13. The circuit of claim 12 wherein each of said third and fourth current paths includes a transistor having a gate connected to said second current path such that currents through said third and fourth current paths are controlled by current through said second output path.

14. The circuit of claim 13 wherein each of said first and second current paths includes a transistor having a gate connected to said third current path such that currents through said first and second current paths are controlled by current through said third output path.

15. The circuit of claim 12 wherein said low and high current density bipolar transistors are parasitic transistors.

16. A circuit for generating a signal that is responsive to variations in temperature comprising:
    a power source that includes a high voltage rail and a low voltage rail;

a first current path between said high voltage rail and low voltage rail, said first current path including a series connection of a first MOS transistor and a high current density bipolar transistor;

a second current path between said high voltage rail and said low voltage rail, said second current path including a series connection of a second MOS transistor, a low current density bipolar transistor and a first electrical resistance therebetween; and output circuitry means connected with respect to said first and second current paths for forming an output signal that is an indication of current change as a function of temperature, wherein said high current density bipolar transistor and said low current density bipolar transistor are parasitic bipolar transistors of MOS processing.

17. A circuit for generating a signal that is responsive to variations in temperature comprising:

a power source that includes a high voltage rail and a low voltage rail;

a first current path between said high voltage rail and low voltage rail, said first current path including a series connection of a first MOS transistor and a high current density bipolar transistor;

a second current path between said high voltage rail and said low voltage rail, said second current path including a series connection of a second MOS transistor, a low current density bipolar transistor and a first electrical resistance therebetween, said first and second MOS transistors having different geometries such that a current through said first MOS transistor is a multiple of the current through said second MOS transistor, said high and low current density bipolar transistors being formed such that a current density of said high current density bipolar transistor is a multiple of the current density of said low current density bipolar transistor; and output circuitry means connected with respect to said first and second current paths for forming an output signal that is an indication of current change as a function of temperature, wherein said first current path includes a third MOS transistor connected in series between said high voltage rail and said first MOS transistor and said second current path includes a fourth MOS transistor connected in series between said high voltage rail and said second MOS transistor, said third and fourth MOS transistors having different geometries such that the relationship of the different geometries corresponds to the relationship of the different geometries of said first and second MOS transistors.

18. The circuit of claim 17 further comprising control circuitry means for controlling the current through said first and second MOS transistors, said control circuitry including a series connection of a fifth MOS transistor and an electrical resistance, said control circuitry being connected to gates of said first and second MOS transistors to control current flow therethrough, whereby said control circuitry provides a third current path between said high voltage rail and said low voltage rail.

19. The circuit of claim 18 wherein said electrical resistance includes a sixth MOS transistor and a third bipolar transistor having geometries generally equivalent to a series connection of said transistors of said first current path.

\* \* \* \* \*